April 28, 1953     J. K. CLARK     2,636,685

THERMOSTATIC CONTROL VALVE

Filed Sept. 14, 1949

INVENTOR.
JAMES K. CLARK
BY Woodling and Krost
his attorneys

Witness:
Clyde H. Haynes

Patented Apr. 28, 1953

2,636,685

UNITED STATES PATENT OFFICE 2,636,685

THERMOSTATIC CONTROL VALVE

James K. Clark, New Hartford, N. Y., assignor to The Partlow Corporation, a corporation of New York Application September 14, 1949, Serial No. 115,727

2 Claims. (Cl. 236—99)

My invention relates in general to a thermostatically operated control valve.

Temperature responsive valves are widely used in connection with the piping and using of combustible gases. These valves may be used to stop the flow of a combustible gas if the temperature becomes high and thus dangerous. Although the valves are designed for closing at a certain temperature, it is understood that they may be constructed for opening at a certain temperature. In many installations, such for example, the oil field industry, highly corrosive gases are handled at relatively high pressures. The corrosive gas must be completely isolated from the valve temperature responsive mechanism or thermostat assembly to prevent corrosion and thereby sticking of the parts and faulty operation.

One of the objects of my invention is to provide a thermostatically operated control valve wherein any corrosive gases are sealed in and are isolated from the thermostat assembly.

Another object of my invention is to provide a thermostatically operated control valve in which any pressures exerted by the gas being controlled are counterbalanced so that no pressure is transmitted to the thermostatic assembly.

Another object of my invention is to provide the actuating strut which moves the valve pins against the valve seat with a lever arm fulcrumed on an adjustable fulcrum support member to provide a temperature responsive adjustment.

Another object of my invention is to provide a thermostatically operated control valve in which the same parts may be assembled together to operate the valve on decrease in temperature as are assembled together to operate the valve on an increase in temperature.

Another object of my invention is to locate a pair of opposing diaphragms separated by an actuating strut in such position in the valve that gas pressure is exerted against the diaphragms on both ends of the strut, thereby resulting in a counterbalancing of forces so that no pressure or forces from the gas pressure are transmitted to the mechanism which moves the strut.

Figure 1:
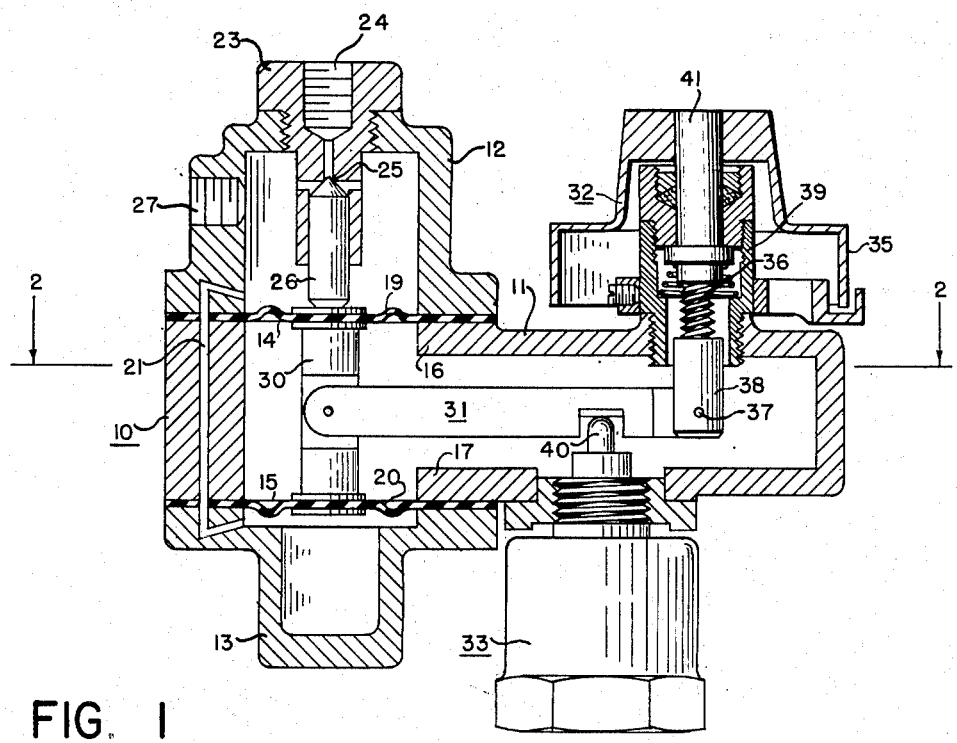
Figure 2:
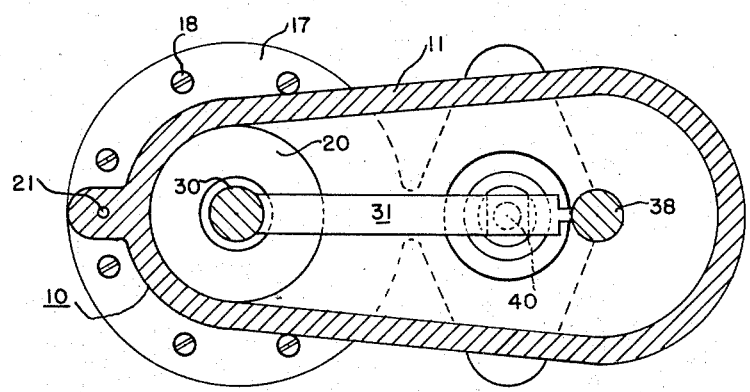

Other objects and a fuller understanding of my invention may be had by referring to the following description and claims, taken in combination with the accompanying drawing, in which:

Figure 1 is a cross-sectional view of my thermostatically operated control valve; and Figure 2 is a sectional view taken along the line 2—2 of Figure 1.

My thermostatically operated valve has a hollow body 10 constructed from a hollow support body 11, a hollow valve cap 12, and a hollow cap 13. The hollow support body 11, as is best illustrated in Figure 1, may be constructed by casting and has oppositely disposed openings 14 and 15 in one end thereof. These openings 14 and 15 are encircled by flange fastening portions 16 and 17, respectively, to which the valve cap 12 and the cap 13 are fastened by bolts 18. A flexible diaphragm 19 is inserted between the valve cap 12 and the hollow support body 11 to form a chamber within the valve cap 12, which chamber is isolated from the hollow support body. Similarly, a flexible diaphragm 20 is inserted between the cap 13 and the hollow support body 11 to form a chamber which is isolated from the hollow support body 11 and disposed in the cap 13. As is illustrated in Figure 1 of the drawings, the valve cap 12 may be said to enclose one end chamber, the cap 13, an opposite end chamber, and the hollow support body 11, a middle chamber which is disposed between the end chambers and between the spaced diaphragms 19 and 20. A pressure equalizing passage 21 interconnects the chamber in the valve cap 12 and the cap 13, so that the pressure in each of these chambers is equal.

The valve cap 12 supports a valve member 23 having an inlet 24 therein, which inlet defines a valve seat 25. The valve member 23 slidably supports an axially moveable valve pin 26, which is seatable against the valve seat 25 to close the inlet. This valve pin 26 abuts the flexible diaphragm 19 and is moved upon flexing of the diaphragm towards and away from the valve seat. The valve pin 26 is disposed with its axis substantially at right angles to the planes of the diaphragms and in substantially co-axial alignment with the caps 12 and 13. The valve cap 12 is also provided with an outlet 27 on one side thereof.

I have provided a strut 30 which is co-axially aligned with the valve pin 26 and extends between the diaphragms 19 and 20. The pressure equalizing passage 21 transfers fluid pressure in the valve cap 12 to the cap 13. Thus any fluid pressure against the diaphragm 19 will also be against the diaphragm 20. The fluid pressure exerted against one end of the strut 30 will be counterbalanced by the fluid pressure exerted against the other end of the strut 30. A valve arm or lever arm 31, having one end thereof fulcrumed to an adjustable support 32 and the other end thereof pinned to the strut 30, is pivoted by a temperature responsive device 33 to move the strut 30 axially, and thereby seat the valve pin 26 against the valve seat 25.

Any fluid pressure existing in the chamber in the valve cap 12 is effectively counterbalanced by the fluid pressure in the chamber of cap 13 so that no pressure is transmitted to the valve arm 31 and the thermostatic assembly or temperature responsive device 33, regardless of variations of such pressure.

The adjustable support 32 is carried by the hollow support body 11 and has a dial 35 located on the outside of the hollow support body 11 for adjusting the position of the fulcrum point connection of the valve arm 31 to the support. The adjustable support 32 includes a plug 39 screwed into an opening in the hollow support body 11. The plug 39 carries a rotatable adjusting shaft 41. The dial 35 is fastened to the shaft 41 and provides a manual handle for turning the shaft. A long lead screw 36 threadedly engages the shaft 41 and threadedly engages a pivot fork 38. The pivot fork provides the adjustable fulcrum point 37 to which one end of the valve arm 31 is pivoted. When the thermostatically operated control valve is in vertical position as illustrated in Figure 1, the rotating of the dial 35 institutes a vertically upward or downward movement of the fulcrum point of the valve arm 31 by means of the screw 36.

The temperature responsive device 33 is also supported by the hollow support body 11 and has a pin 40 which bears against the lever of the valve arm 31 between the ends thereof. Upon change of temperature, the pin 40 of the temperature responsive device 33 pivots the valve arm 31 about the fulcrum end thereof. This moves the strut 30, thereby flexing the diaphragms and moving the valve pin 26 against the valve seat 25.

In the assembly which I have illustrated, the valve pin 26 seats against the valve seat 25 upon an increase of temperature. It is understood, however, that I do not limit my device to the operation only upon an increase of temperature, but intend that it cover any change of temperature. Should my thermostatically operated control valve be used to close the valve when there is a decrease in temperature, the valve cap 12 and the cap 13 may readily be interchanged. When these caps are interchanged, upward movement of the pin 40 will cause the lever arm 31, by means of strut 30, to relieve pressure against the valve pin 26, so that it may be unseated from the valve seat 25 by pressure of the fluid or gas in the inlet.

The control valve described herein has been successfully used for controlling the action of a large valve in the oil field industry, where highly corrosive gases are handled at relatively high pressures. If the flexible diaphragms are constructed of nylon fabric impregnated with Buna n, they have a rupture strength of 600 pounds. The valve has been used on pressures up to 100 pounds, and completely isolated corrosive gases from the delicate temperature responsive apparatus.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A control valve comprising a hollow support housing having opposite openings on one end thereof and an adjustable support member on the other end thereof, a flexible diaphragm covering each of said openings to effect a hermetically sealed housing between said diaphragms, a strut within said support housing simultaneously engaging both flexible diaphragms, a valve lever arm having one end thereof fulcrumed on said adjustable support member and having the other end thereof fulcrumed on said strut, a temperature responsive device operatively bearing against said lever arm between the ends thereof, caps covering and cooperating with said flexible diaphragms to form chambers within the caps, said support housing and said caps having an equalizing passageway interconnecting said chambers, one of said caps having an intake port and an exhaust port with a valve seat about one of said ports, a valve pin slidably supported by said one of said caps with one end abuttable against the nearest flexible diaphragm and with the other end seatable in the valve seat, said valve pin and said strut being in longitudinal alignment generally transversely of the lever arm whereby responding of the temperature responsive device pivots the lever arm to flex the diaphragms and control the seating of the valve pin in the valve seat.

2. A control valve comprising a hollow support housing having identical opposite openings on one end thereof and an adjustable support member on the other end thereof, said adjustable support member closing said housing, a flexible diaphragm covering each of said openings to effect a hermetically sealed housing between said diaphragms, a strut within said support housing simultaneously engaging both flexible diaphragms, a valve lever arm having first and second ends and an intermediate bearing point with said first end thereof fulcrumed on said adjustable support member and with said second end thereof pivoted to said strut, a temperature responsive device operatively bearing against the intermediate bearing point of said lever arm, interchangeable caps fastened to said housing covering and cooperating with said flexible diaphragms to form chambers therebetween, said support housing and said caps having an equalizing passageway interconnecting said chambers, one of said caps having an intake port and an exhaust port with a valve seat about one of said ports, said one of said ports being substantially axially aligned with said caps and with said strut, a valve pin slidably supported by said one of said caps and axially aligned therewith with one end abuttable against the nearest flexible diaphragm and with the other end seatable in the valve seat, movement of said nearest flexible diaphragm toward said valve seat moving said valve pin toward said valve seat, said valve pin and said strut being in longitudinal alignment generally transversely of the lever arm whereby responding of the temperature responsive device pivots the lever arm to flex the diaphragms and control the seating of the valve pin in the valve seat.

JAMES K. CLARK.

References Cited in the file of this patent

UNITED STATES PATENTS

| Number | Name | Date |
|---|---|---|
| 982,229 | Adair | Jan. 24, 1911 |
| 2,022,583 | Bicknell | Nov. 26, 1935 |
| 2,034,053 | Morgan | Mar. 17, 1936 |

FOREIGN PATENTS

| Number | Country | Date |
|---|---|---|
| 163,085 | Great Britain | May 13, 1921 |